(12) United States Patent
Di Bella et al.

(10) Patent No.: US 6,248,231 B1
(45) Date of Patent: Jun. 19, 2001

(54) APPARATUS WITH VORAXIAL SEPARATOR AND ANALYZER

(76) Inventors: Alberto Di Bella, 98 SE. 7th St., Deerfield Beach, FL (US) 33441; Michael M. Anthony, 10189 W. Sample Rd., Parkland, FL (US) 33065

(*) Notice: Subject to any disclaimer, the term of this patent is extended or adjusted under 35 U.S.C. 154(b) by 0 days.

(21) Appl. No.: 09/524,517

(22) Filed: Mar. 13, 2000

(51) Int. Cl.[7] ................................................. B01D 17/12
(52) U.S. Cl. ............................ 210/85; 210/94; 210/143; 210/512.3; 494/7; 494/51
(58) Field of Search ........................... 210/85, 94, 96.1, 210/143, 512.1, 512.3, 739, 743, 787, 789, 923; 494/1, 5, 7, 10, 23, 27, 51–53; 356/308, 440

(56) References Cited

U.S. PATENT DOCUMENTS

| | | | |
|---|---|---|---|
| 3,517,821 | * 6/1970 | Monson et al. | 210/512.1 |
| 4,478,712 | * 10/1984 | Arnaudeau | 210/512.3 |
| 5,084,189 | * 1/1992 | Richter | 210/512.1 |
| 5,840,006 | * 11/1998 | Leung et al. | 494/53 |
| 5,904,840 | * 5/1999 | DiBella | 210/512.1 |
| 5,948,271 | * 9/1999 | Wardwell et al. | 494/10 |

* cited by examiner

*Primary Examiner*—Joseph W. Drodge
(74) *Attorney, Agent, or Firm*—Oltman, Flynn & Kubler (57) ABSTRACT

A voraxial separator and analyzer apparatus includes a composite fluid passing tube having a tube upstream segment and a tube downstream segment; a rotation acceleration vane structure rotationally mounted within the tube upstream segment and being oriented to deliver angular acceleration to a composite fluid within the tube about the longitudinal axis of the tube for separating the fluid into radially stratified component layers within the tube in the order of component density and to propel the fluid toward and through the tube downstream segment; an acceleration vane drive mechanism drivably connected to the rotation acceleration vane structure; a rotation maintenance vane structure rotationally mounted within the tube downstream segment and being oriented to deliver angular acceleration to a composite fluid within the tube about the longitudinal axis of the tube for maintaining the rotational velocity of the fluid imparted by the rotation acceleration vane structure against friction losses; and a maintenance vane drive mechanism drivably connected to the rotation maintenance vane structure.

5 Claims, 14 Drawing Sheets

APPARATUS WITH VORAXIAL SEPARATOR AND ANALYZER

BACKGROUND OF THE INVENTION

1. Field of the Invention

The present invention relates generally to the field of oil reclamation devices. More specifically the present invention relates to a voraxial separator and analyzer apparatus for separating and reclaiming oil from water, such as in the aftermath it of a tanker ship oil spill, and for separating and reclaiming pure water from industrial contaminants. The apparatus includes a composite fluid passing tube containing a first set of rotation vanes referred to as rotation acceleration vanes connected to vane rotation means. The set of rotation acceleration vanes is oriented to deliver angular acceleration to a composite fluid within the tube about the longitudinal axis of the tube to a given rotational speed at which the component fluids making up the composite fluid separate into radially stratified layers according to their densities. A second set of rotation vanes referred to as rotation maintenance vanes is inventively provided within the tube downstream of the rotation acceleration vanes which preferably provide just enough angular force to sustain the rotation of the stratified component fluids against the force of friction at the tube wall and against fluid viscosity, and thus to prevent turbulence resulting from transition to a lower angular speed which would result in loss of the fluid stratification. A second key feature of the present invention is the provision of an analyzer system including an integrated package uniting two motors with two systems. A feedback loop in communication with a computer monitor and a method of spinning fluid are provided. A tachometer is connected to the set of rotation maintenance vanes to measure fluid rotation rate, and is wired to the feedback loop.

2. Description of the Prior Art

Millions of gallons of precious fuel oil are obtained from wells each year, and yet great quantities of sludge and water often mix with this fuel oil and must be removed to make the oil usable. In some areas of the world drinking water is in short supply and must be separated from contaminants. Major sources of drinking water contamination are chemicals and particulate matter mingling with cleaning water used during metal finishing and other chemical etching processes. Separation of such contaminants represents an economic burden and more often a loss of precious drinking water. In Europe the rising cost of water and water processing plants which use existing purification methods such as the ion exchange systems has become a major concern for government and industry alike. Industrial wastes and fuels entering water supplies have also had profound environmental and economic impacts on coastal fishing grounds. In order to rapidly purify, capture and store pure water, and to recover lost fuel and other recyclable contaminants, the water and contaminant mixtures must be pumped from storage reservoirs and separated. A voraxial separation system capable of achieving such separation is disclosed generally in U.S. Pat. No. 5,084,189 issued to the present applicant.

Many of the specifications of the present separator are described in U.S. Pat. No. 5,084,189, the disclosure of which is incorporated herein by reference. A limitation of this prior separator, however, has been the prospect of turbulence within the flow stream following angular acceleration and radial component stratification, resulting from transition to lower rotational speed, causing some intermixing of stratified layers.

It is thus an object of the present invention to provide a composite fluid separation apparatus which separates a composite fluid medium consisting of one or more component fluids including contaminants of different densities by centrifugal acceleration and stratification of the medium, which is induced by forces imparted by a set of rotation acceleration vanes to cause the medium to spin axially within a composite fluid passing tube, creating a force vortex action on the medium body which in turn causes the spun medium to separate into its component fluids and contaminants at different radii corresponding to their respective densities, the separated medium being transported axially along the cylindrical pipe and separated by radially positioned pipe intakes. The lighter fluid is forced by free vortex action and by Bernoulli pressure forces into a tight cylindrical flow along the central axis of the spinning medium, while the heavier particles are spun along the outer radii of the spinning medium.

It is another object of the present invention to provide such an apparatus which, in addition to voraxially accelerating and stratifying component fluids for independent removal from the flow stream, maintains the necessary stratification speed against deceleration turbulence until component fluid removal is accomplished.

It is another object of the present invention to provide such an apparatus which automatically monitors and controls the rotation acceleration and maintenance vane speeds necessary to cause and maintain fluid separation through use of sensors and a feedback loop tied to a computer.

It is another object of the present invention to provide such an apparatus which includes sensory and detection means to monitor the concentration of contaminants in both the contaminant take off pipe and the fluid take off pipe.

It is another object of the present invention to provide such an apparatus which provides a method of monitoring the amount of unseparated fluid within the different radially separated layers, and to compute feedback signals to correctly determine and control the rotation speed of the separator and achieve maximum separation results.

It is another object of the present invention to provide such a method of monitoring the amount of unseparated fluids and to compute a feedback signal in order to control a bleed valve and thus to modify the density of the medium by injection of air into the medium before the separation. The air stream serves to modify the density of the centrally separated fluid stream and thus to minimize the loss of the higher density fluids to the central stream.

It is another object of the present invention to provide such an apparatus which efficiently separates the various components of contaminated fluid, such as water mixed with mud, oil and slimes, and to differentiate these components into their various densities, so that they can be removed from the flow stream, for the purposes of recovery and removal of the components.

It is still another object of the present invention to provide such an apparatus which relies on a computerized analyzer system that efficiently separates the various components of contaminated fluid for the purposes of recovery and removal of the components.

It is finally an object of the present invention to provide is such an apparatus which relies on a feedback loop with a computerized analyzer system that efficiently determines the concentrations of the various components of contaminated fluid for the purposes of recovery and/or removal of the components.

The foregoing and other objects of the invention are achieved by provision of an axial flow type pump for separating immiscible fluids having different specific gravities and a discharge manifold fluid connected to the fluid pump for drawing of the fluid having the heavier specific gravity; a sensor attached to the inlet flow into the separator; a sensor attached to the outlet flow of the separator; a sensor attached to the central light fluid take off manifold; a signal generating means from the sensors; means for transporting the signal generated in the sensors to a signal processing analyzer, and computing a feedback control signal; means for using the computed feedback signal to accurately control the speed of the separator and the amount of air intake into the separator.

The present invention is an apparatus for the efficient and consistent separation of the components of a fluid with a built in integrated analyzer for determining the concentration of each component of the separated fluid. The purpose of the invention is to separate unwanted components of the fluid by means of a voraxial separator and to analyze the separated components thereof with a complete integrated control system. The present invention has the advantages of an integrated and complete system that embodies all of the elements of the analyzer and the voraxial separator in one unit. The apparatus consists of a voraxial separator of unique design, which relies on the free rotation of a fluid rather than the forced rotation of a fluid, and thus is not subject to the various hydrodynamic limitations of current centrifugal separators on the market, the apparatus also consists of a sensor probe, where the sensor probe relies on the varying scatter fields of electromagnetic radiation by density variations of the probe; a means of receiving the electromagnetic radiation through fiber-optic cables; and a means of computing the density field of the fluid at a given cross section; and a motor controller means for adequately controlling the separation rate of the voraxial separator. One distinguishing design of the present apparatus from the prior art is the use of specially designed guiding surfaces and specially shaped vanes that propel and control the centrifugal flow of the fluid during the separation stage.

SUMMARY OF THE INVENTION

The present invention accomplishes the above-stated objectives, as well as others, as may be determined by a fair reading and interpretation of the entire specification.

A voraxial separator and analyzer apparatus is provided, including a composite fluid passing tube having a tube upstream segment and a tube downstream segment; a rotation acceleration vane structure rotationally mounted within the tube upstream segment and being oriented to deliver angular acceleration to a composite fluid within the tube about the longitudinal axis of the tube for separating the fluid into radially stratified component layers within the tube in the order of component density and to propel the fluid toward and through the tube downstream segment; an acceleration vane drive mechanism drivably connected to the rotation acceleration vane structure; a rotation maintenance vane structure rotationally mounted within the tube downstream segment and being oriented to deliver angular acceleration to a composite fluid within the tube about the longitudinal axis of the tube for maintaining the rotational velocity of the fluid imparted by the rotation acceleration vane structure against friction losses; and a maintenance vane drive mechanism drivably connected to the rotation maintenance vane structure.

The apparatus preferably additionally includes a second rotation maintenance vane structure within the tube downstream segment downstream of the rotation maintenance vane structure. The rotation acceleration vane structure optionally includes a belt driven impeller. The rotation maintenance vane structure optionally includes a belt driven impeller.

The apparatus preferably additionally includes a fluid probe extending into the tube downstream of the rotation acceleration structure positioned to detect fluid composition at several radial locations within the tube and to generate probe signals, and a fluid analyzer computer receiving and analyzing the probe signals and displaying fluid composition information.

The apparatus preferably still additionally includes a first speed control mechanism controlling the rotational rate of the acceleration vane drive mechanism; a second speed control mechanism controlling the rotational rate of the maintenance vane drive mechanism; a feedback loop mechanism interconnecting the fluid analyzer computer mechanism and the first speed control mechanism and the second speed control mechanism; so that the fluid analyzer computer causes the first speed control mechanism to alter the rate of rotation of the rotation acceleration vane structure to achieve and maintain radial layer component separation and to alter the rate of rotation maintenance vane structure rotation to achieve and maintain the rotation speed of the fluid emerging from the rotation acceleration vane structure with automatic control and feedback.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 1:
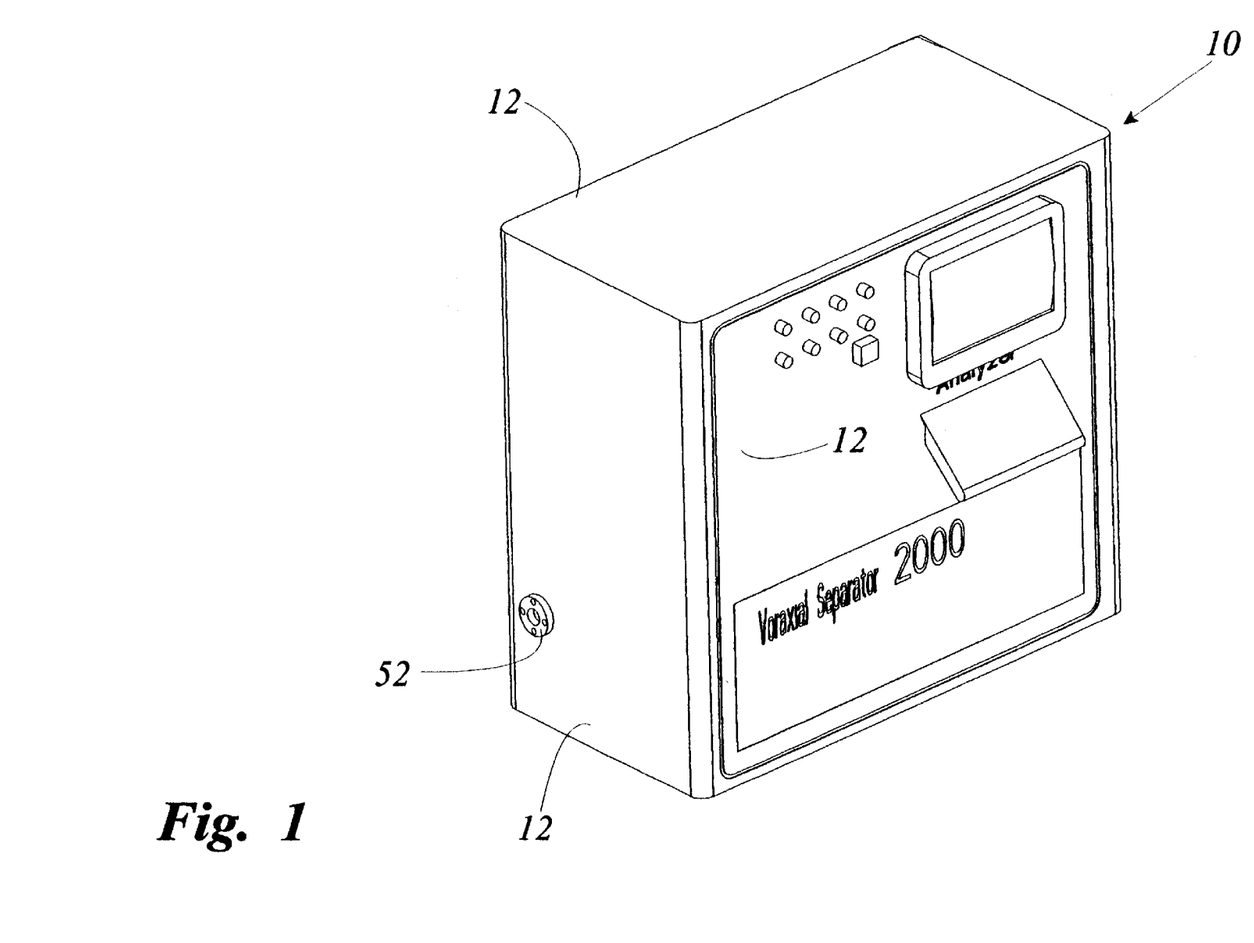
FIG. 1 is a perspective view of the complete apparatus, showing primarily the exterior of the housing and the inlet port and controls.
Figure 2:
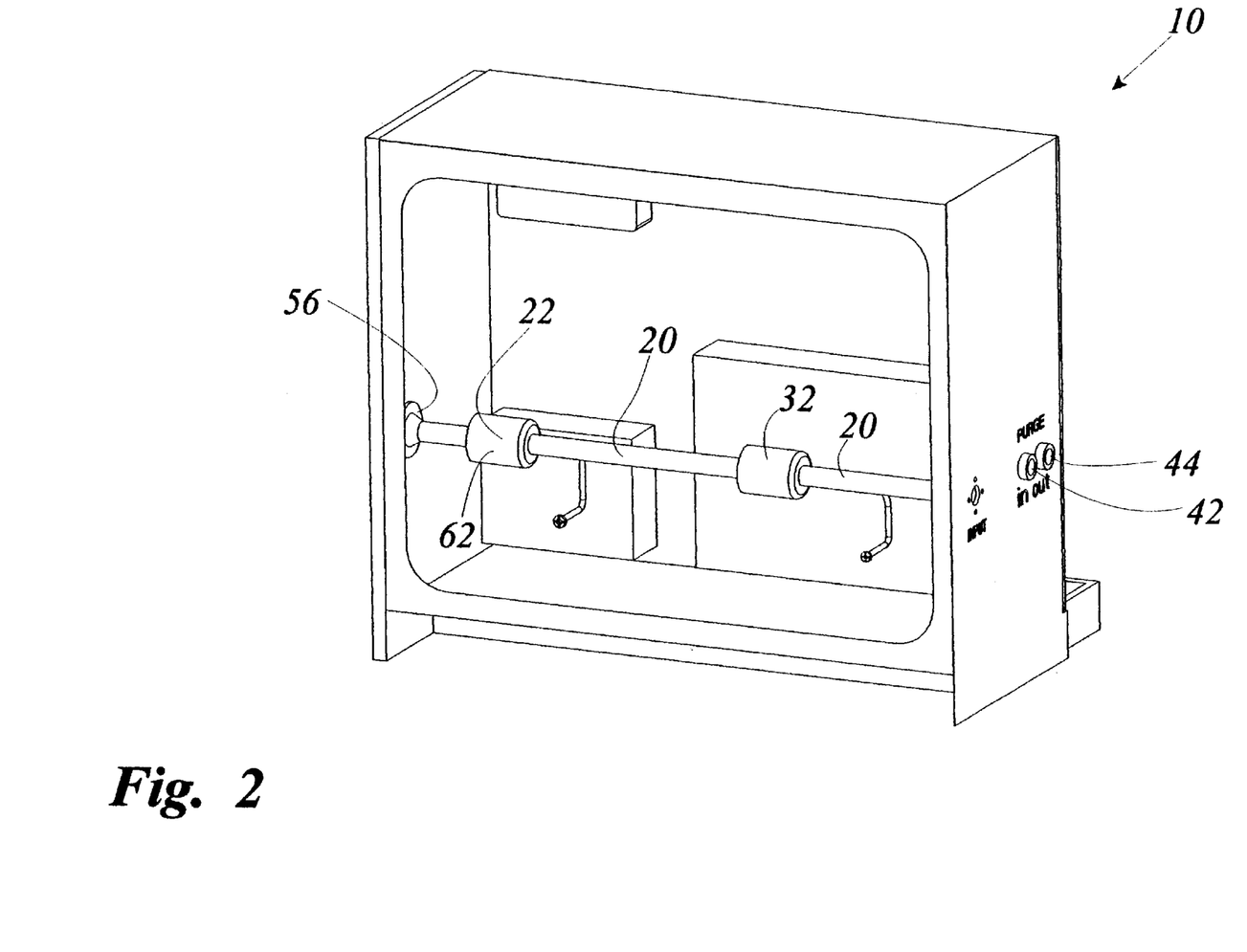
FIG. 2 is a perspective view of the housing with the forward housing wall removed to reveal the voraxial tube, rotational acceleration and maintenance vane structures.
Figure 3:
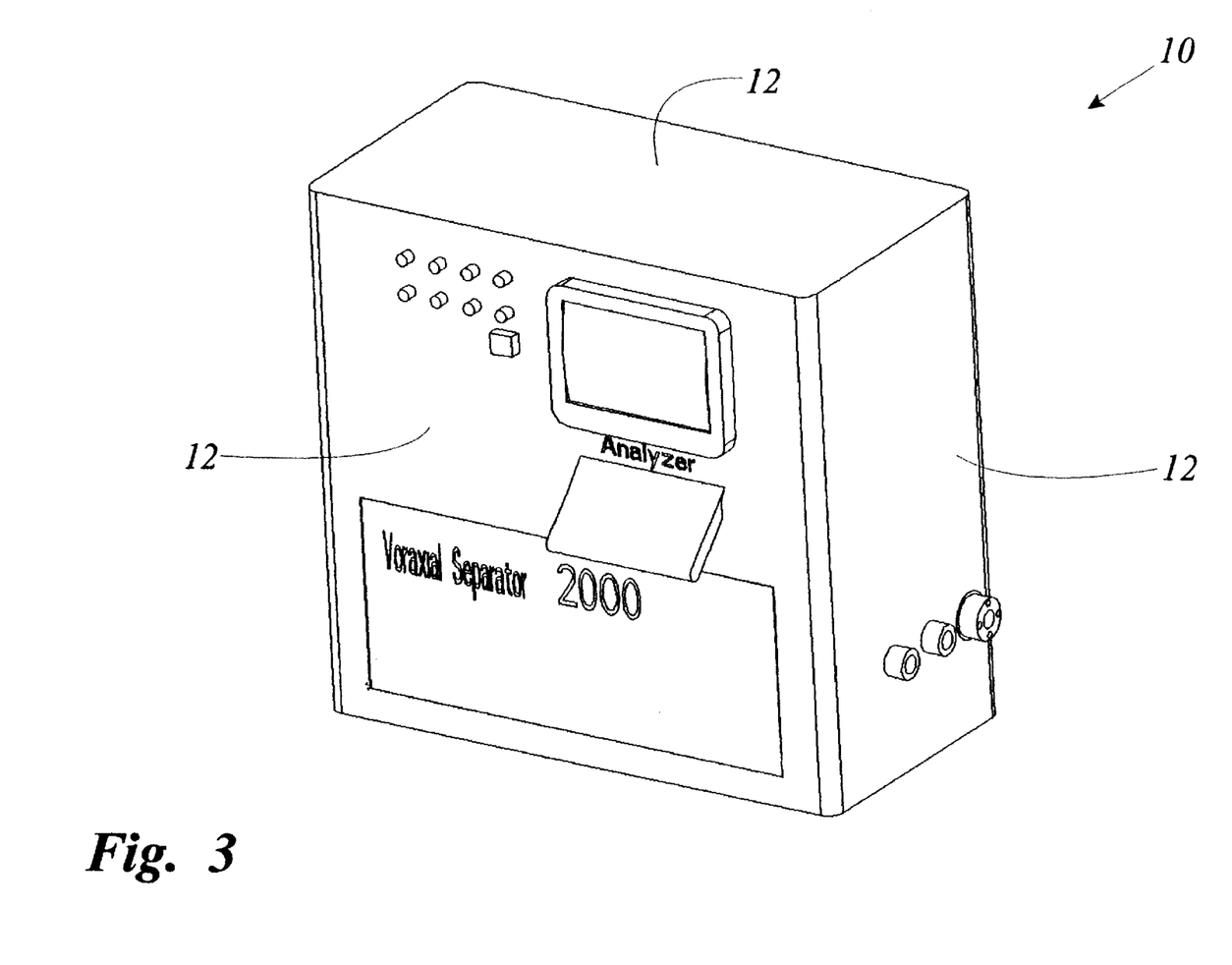
FIG. 3 is a perspective view of the apparatus as in FIG. 1, but shown from the opposing, discharge side.
Figure 4:
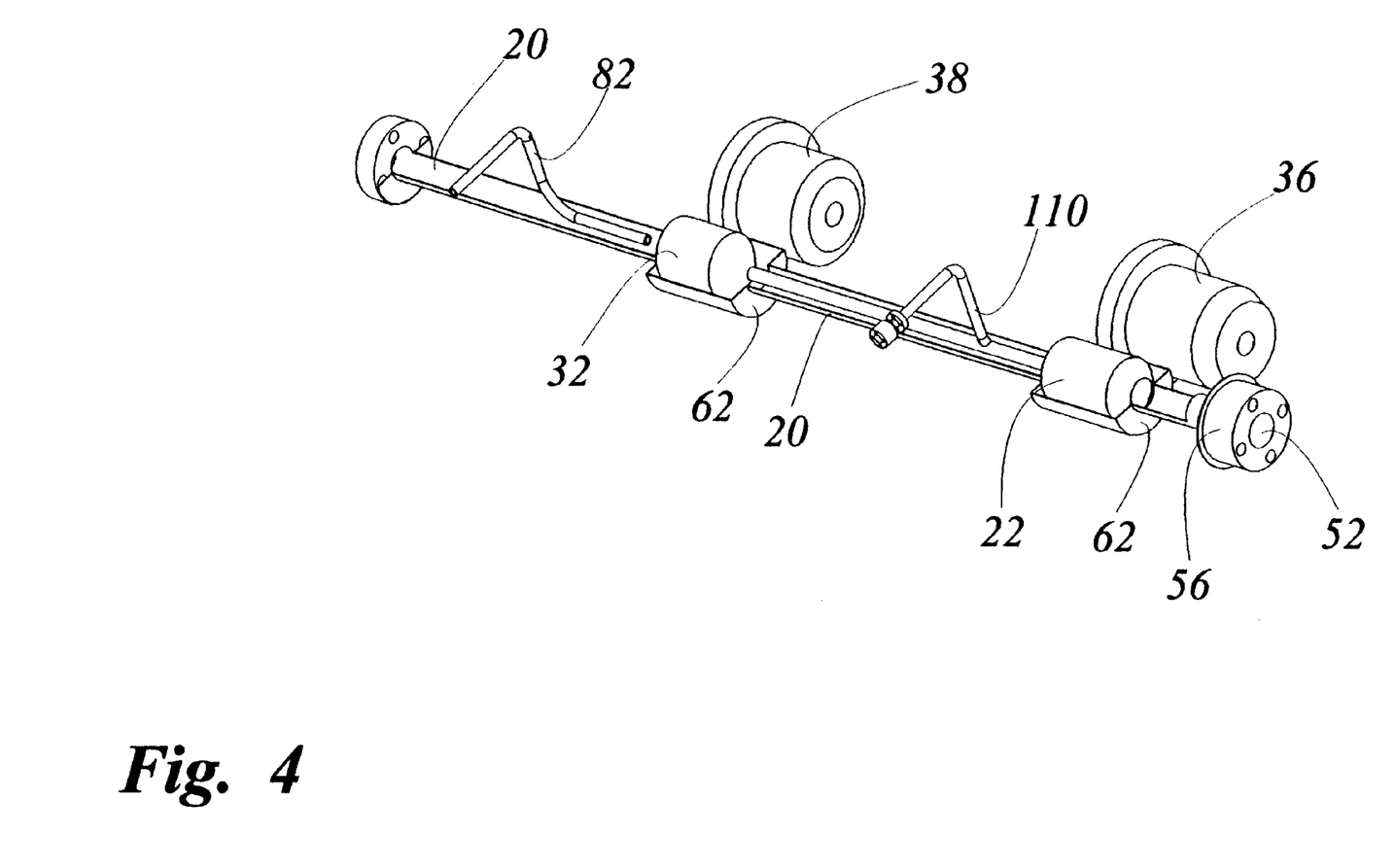
FIG. 4 is a perspective view of the voraxial separation assembly, including the voraxial tube having the intake and output tube end flanges and showing the rotational acceleration and maintenance vane structures and drive means, and also showing a layer removal tube and a probe.
Figure 5:
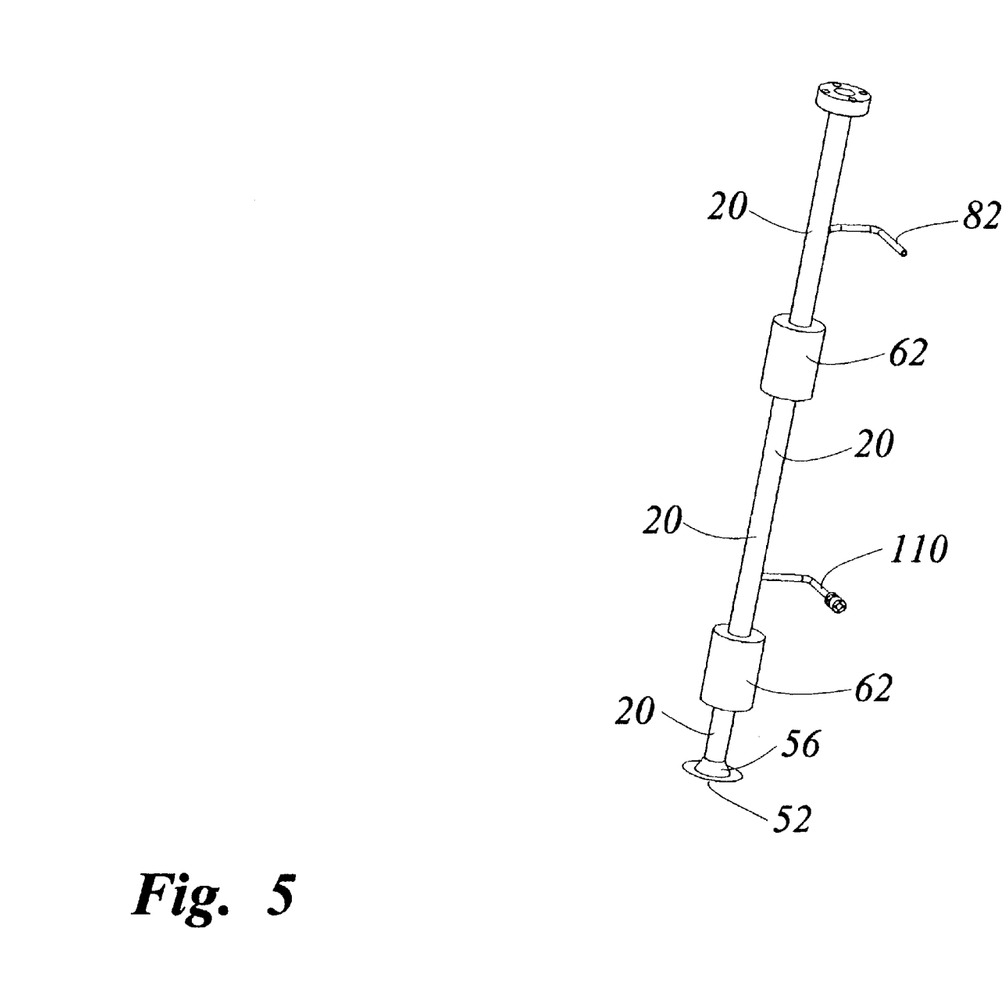
FIG. 5 is another perspective view of the voraxial separation assembly, showing two of the probes, one downstream of the rotation acceleration vane structure and the other downstream of the rotation maintenance vane structure.

Referring to FIGS. 1–14, a voraxial separator and analyzer apparatus 10 is disclosed. Apparatus 10 includes a composite fluid passing voraxial tube 20 containing a first set of rotation vanes referred to as rotation acceleration vane member 22 connected to vane rotation means 24. The set of rotation acceleration vane member 22 is oriented to deliver angular acceleration to a composite fluid within the tube 20 about the longitudinal axis of the tube 20 to a given rotational speed at which the component fluids making up the composite fluid separate into radially stratified layers. The set of rotation acceleration vane member 22 also deliver linear, axial velocity to the composite fluid to propel the composite fluid through the tube 20 while it is being separated. A second set of rotation vanes referred to as rotation maintenance vane member 32 as shown in FIGS. 2 and 4, is inventively provided within the tube 20 downstream of the set of acceleration vane member 22. Rotation maintenance vane member 32 preferably provide just enough angular force to sustain the rotation of the stratified component fluids against the force of friction at the tube wall and against internal friction of the fluid resulting from the fluid viscosity, and thus prevent turbulence resulting from transition to a lower rotational speed which would result in loss of some of the fluid stratification. Absent rotation maintenance vane member 32, the fluid stream would reach a point of transition flow a certain distance beyond the acceleration vanes at which reverse flow in the form of angular deceleration and crossflow between stratified layers would result, causing as well as resulting from associated turbulence. A turbulence-free transition from forced vortex to free vortex is thus provided by rotation maintenance vane member 32. Additional sets of rotation maintenance vanes (not shown) are optionally provided periodically further downstream, depending upon the length of tube 20, as is necessary to maintain stratification speed and prevent deceleration turbulence. The set of rotation acceleration vanes and set or sets of rotation maintenance vanes are each preferably belt driven impellers as described below, but may take other forms.

A second key feature of the present invention is the provision of an analyzer and feedback system including an integrated package uniting two motors with two systems. A feedback loop in communication with a computer monitor and a method of spinning fluid are provided. A tachometer is connected to the set of rotation maintenance vanes to measure fluid rotation rate, and is wired to the feedback loop.

Figure 6:
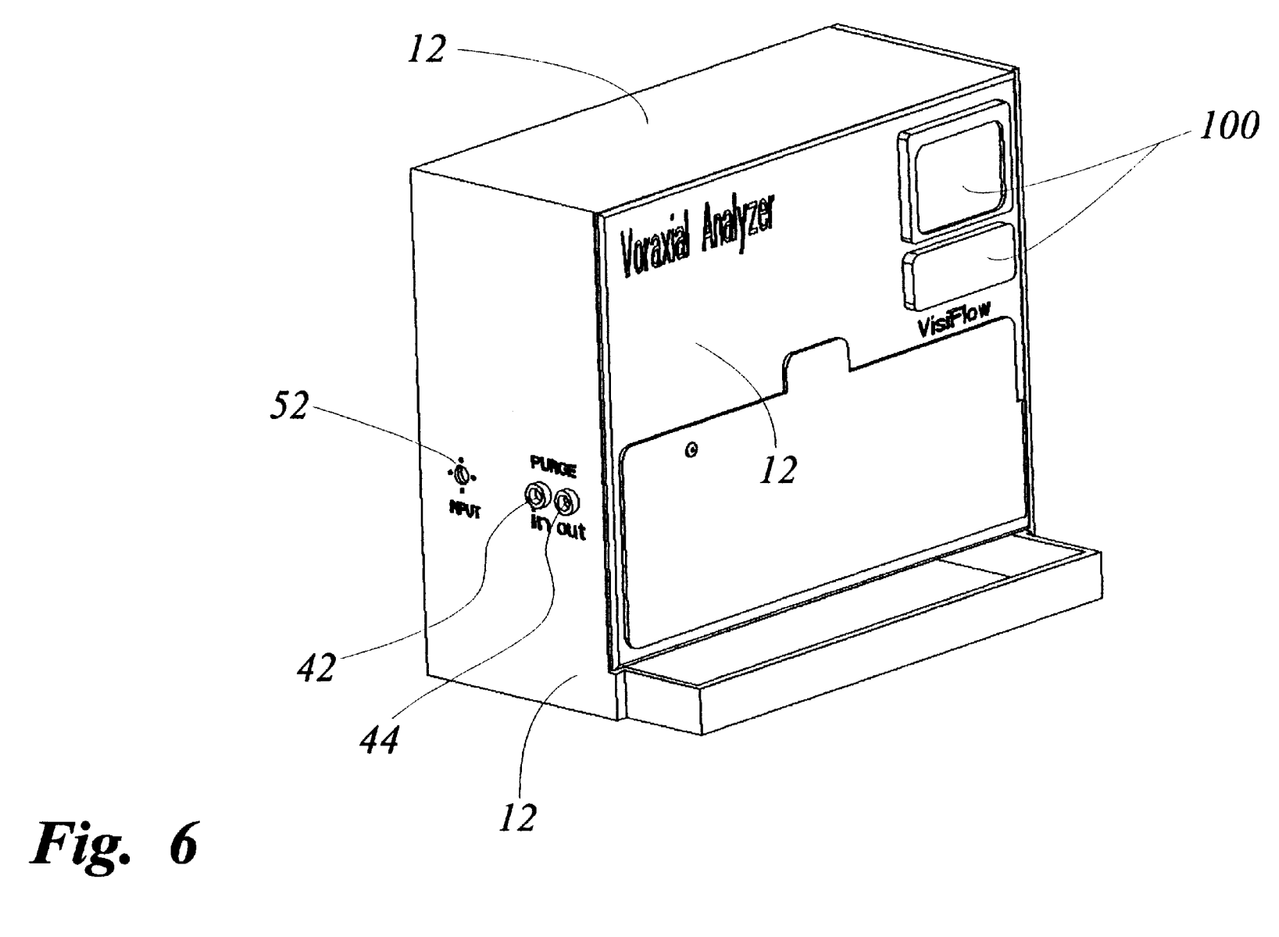
FIG. 6 is a perspective view of the apparatus.
Figure 7:
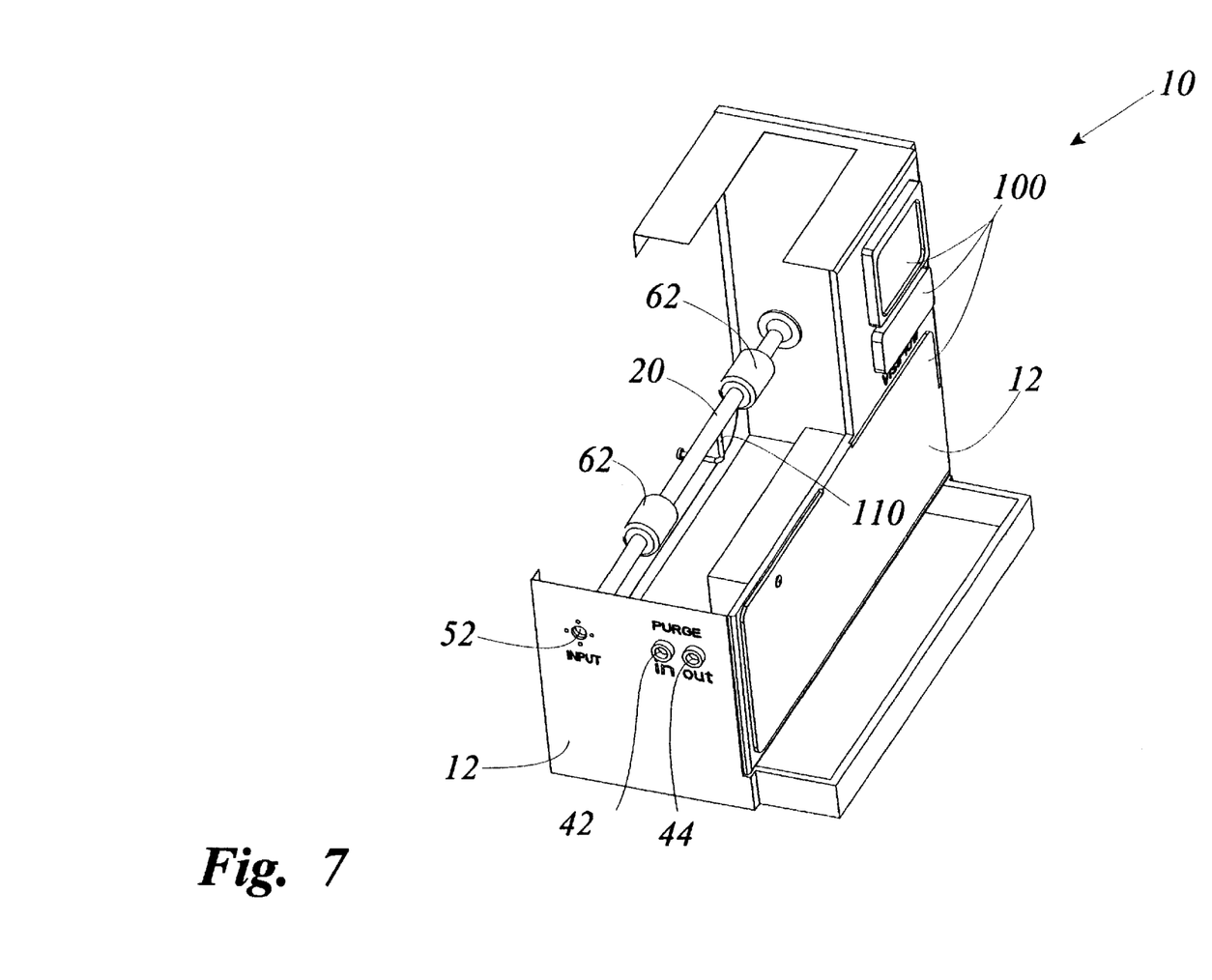
FIG. 7 is another perspective view of the apparatus with a top portion of the housing removed to reveal some of the voraxial separation assembly.

Apparatus 10 includes a housing 12, as shown in FIGS 1, 3, 6, and 7, which is designed to meet the requirements of fire resistance in petrochemical and chemical processing plants. The housing 12 retains all the components of apparatus 10 within a sealed environment. A purge gas input port 42 is provided, as shown in FIGS. 6 and 7, to permit the interior of the apparatus 10 components including tube 20 to be cleaned and purged from all explosive gases before electric power is connected to the apparatus 10 components. In a petrochemical plant, this purging permits apparatus 10 to be used without fear of causing an explosion when electrical power is supplied to apparatus 10. The purge gas is regulated at a fixed input pressure greater than atmospheric pressure, so that during the initial operation of apparatus 10, inert gas such as nitrogen is introduced throughout the inside of apparatus 10, and permitted to purge and displace any contaminating gas that may have accumulated inside apparatus 10. A second output purge port 44 is provided to remove the contaminant gases from inside apparatus 10. Thus a stable gas flow is established between purge ports 42 and 44 which serves to clean apparatus 10 during operation.

Apparatus 10 has a fluid input port 52 for receiving any flowable fluid F for voraxial separation. Port 52 can be a bolt-on-flange of standard design in the industry. Port 52 is the connection member to the entry port for voraxial tube 20. Voraxial tube 20 is designed to permit very smooth flow of the fluid F, so that as little turbulence as possible is created within the flowing fluid. A guiding cone 56 permits the fluid to accelerate into the fluid drive housing 12.

Figure 10:
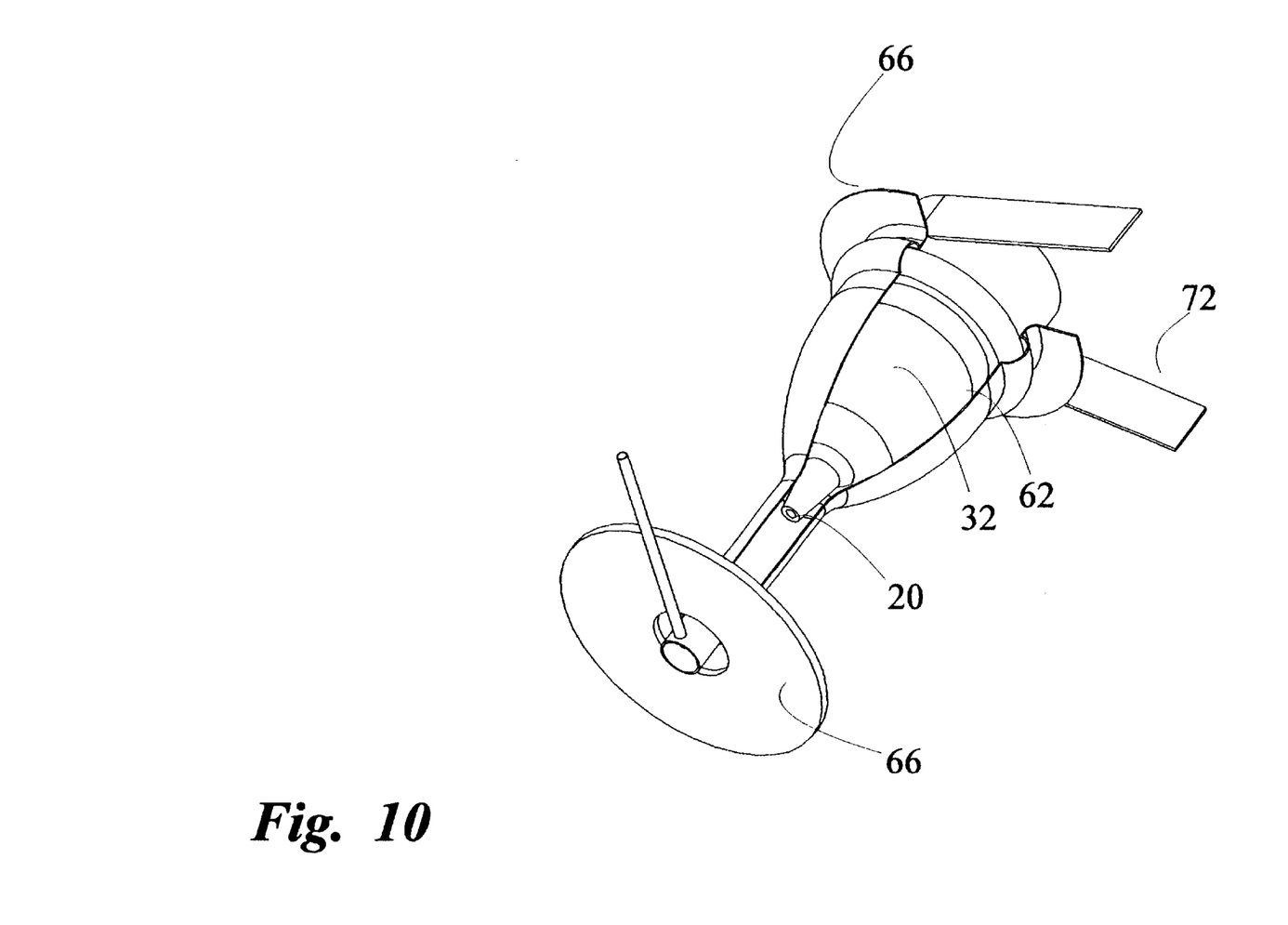
FIG. 10 is a perspective broken away view of the one of the rotational vane structures.
Figure 11:
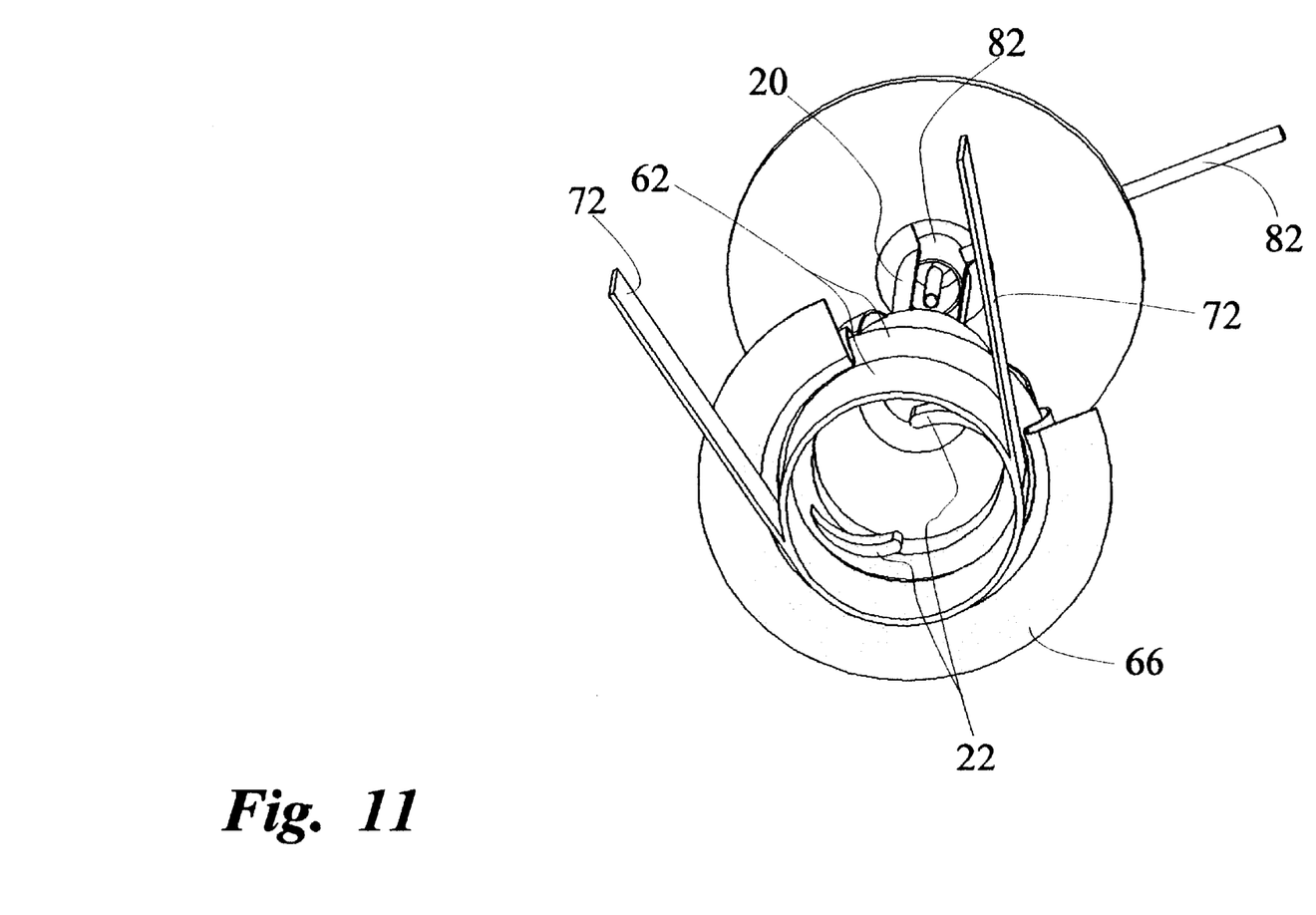
FIG. 11 is another perspective view of the structure of FIG. 10.
Figure 12:
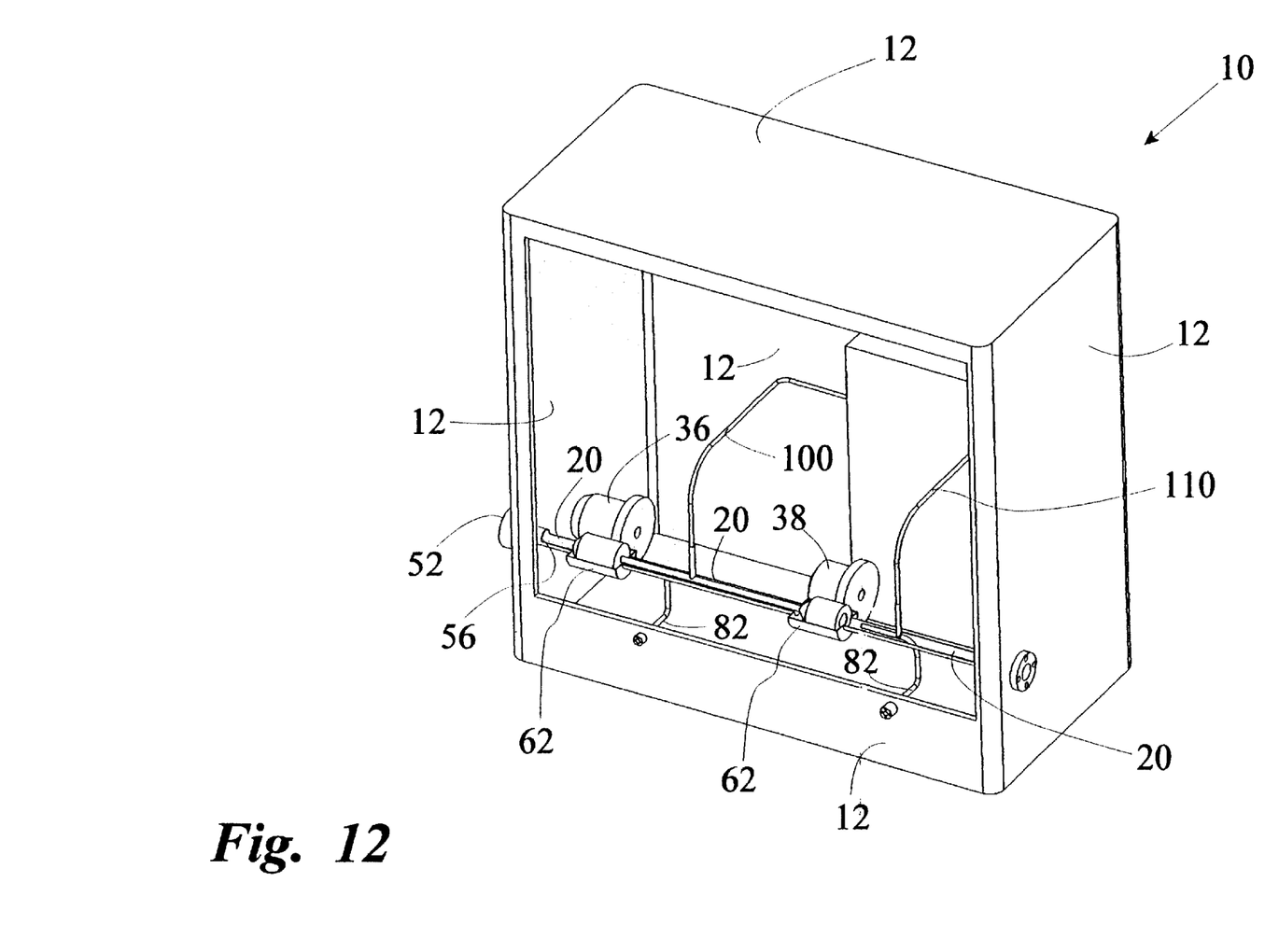
FIG. 12 is a perspective view of the apparatus with the housing front wall removed.

During operation, fluid input port 52 is connected to the intake pipe (not shown) of the fluid reservoir which is to be processed and separated. A portion of the voraxial tube 20 is sealingly connected to a larger fluid drive housing 62. Inside fluid drive housing 62, as shown in FIGS. 2, 4, 5, 7, 9 and 12, is an acceleration vane member 22 as shown in FIGS. 10 and 11, which is designed to be powered by a fluid drive acceleration vane motor 36. The acceleration vane member 22 rotates relative to the fluid drive housing 62 through a set of centering sealing bearings 64. Motor 36 is connected to a rotational drive flange 66 of vane member 22 by either gears (not shown) or by a fine friction belt 72. Motor 36 drives belt 72 which then imparts the rotational energy to acceleration vane member 22. Vane member 22 couple with fluid inside voraxial tube 20. The rotation rate of acceleration vane member 22 is measured by a tachometer 74 attached to drive flange 66. A torque sensor 76 is also provided on drive flange 66 to determine the torque needed to spin the fluid and its components by the acceleration vane member 22 at a given rotation rate.

The acceleration vane member 22 couples with fluid F, creating a low pressure vortex that rapidly pulls fluid through the vane member 22. The rapid rotation of the fluid F results in unhindered radial density differential separation of the fluid and its components by reason of the centrifugal forces acting on the fluid components A–C. Fluid components A, B and C represent the extreme density ranges of the components of the fluid F. Since the rotation of the fluid is a forced rotation, a rapid density gradient is experienced by the fluid F, causing the heavier components of fluid F to move toward the periphery of the voraxial tube 20, while the lighter components are pushed toward the center of the voraxial field. The forced vortex configuration only occurs when the fluid is being propelled and spun in the acceleration vane member 22. The situation becomes drastically different when the free vortex is permitted to form and be maintained downstream of the acceleration vane member 22. Just a few centimeters downstream of the forced vortex tail, a free vortex starts to form and the fluid starts to become dynamically stable as a free vortex. Although the pure fluid has a constant density, a pressure field develops that creates a central field of low pressure in the free vortex. The free vortex then starts to pull the heavier particles and fluid components into the center of the voraxial tube 22. A first collector tube 82 removes most of the heavier components of the fluid, filtering about 99.9 percent of the solids and heavy fluid components in the fluid F. After this filtering, fluid F is essentially free from most of the solid and chemical components of heavier density than fluid F. The clean fluid stream then enters a maintenance vane member 32. Maintenance vane member 32 is essentially of similar design to acceleration vane member 22, and is powered by motor 38. However the rotation rate of maintenance vane member 32 is very well controlled to match the free rotation rate of the fluid F.

In conventional centrifuges, the crossover from a forced vortex field to free vortex field causes some turbulence that can de-stabilize the transition region of the denser components. The present apparatus 10 is thus advantageously designed to solve this problem by first applying the centrifuge technique on the fluid F with acceleration vane member 22, and then rapidly pulsing maintenance vane member 32 to impart rotational vectors on the fluid F, so that during each pulse, the friction loss of rotational energy of fluid F is compensated for by the energy imparted on fluid F by maintenance vane member 32. Instead of turbulence building up downstream of acceleration vane member 22, maintenance vane member 32 causes the fluid to maintain a free vortex configuration without ever entering a transition zone in maintenance vane member 32. Thus a finer separation is always maintained by the apparatus 10. Apparatus 10 is equipped with a computer and analyzer system 100, which receives information from the acceleration vane member 22 and maintenance vane member 32, and then calculates and controls the rotation rate of motor 36, and motor 38 from data received from the tachometers 74, and torque sensors 76. Thus by relaxing the rotation rate of maintenance vane member 32 to exactly match the rotation of the fluid that has been imparted in a forced vortex by the acceleration vane member 22, the vane member 22 does not impart any energy to the fluid other than that needed to overcome loses due to friction. The computer analyzer system 100 thus serves to just drive the fluid F at the desired separation speed while minimizing the forced vortex conditions on the fluid F. Thus the crossover or transition from the forced vortex to free vortex is minimized considerably. This in turn maximizes the separation efficiencies of the apparatus 10. In addition, the acceleration vane member 22 may also be controlled to impart only rotation energy to make up for friction losses. Thus, after the initial rapid rotation of the fluid F, the fluid is then rotating in essentially a free vortex mode.

Figure 8:
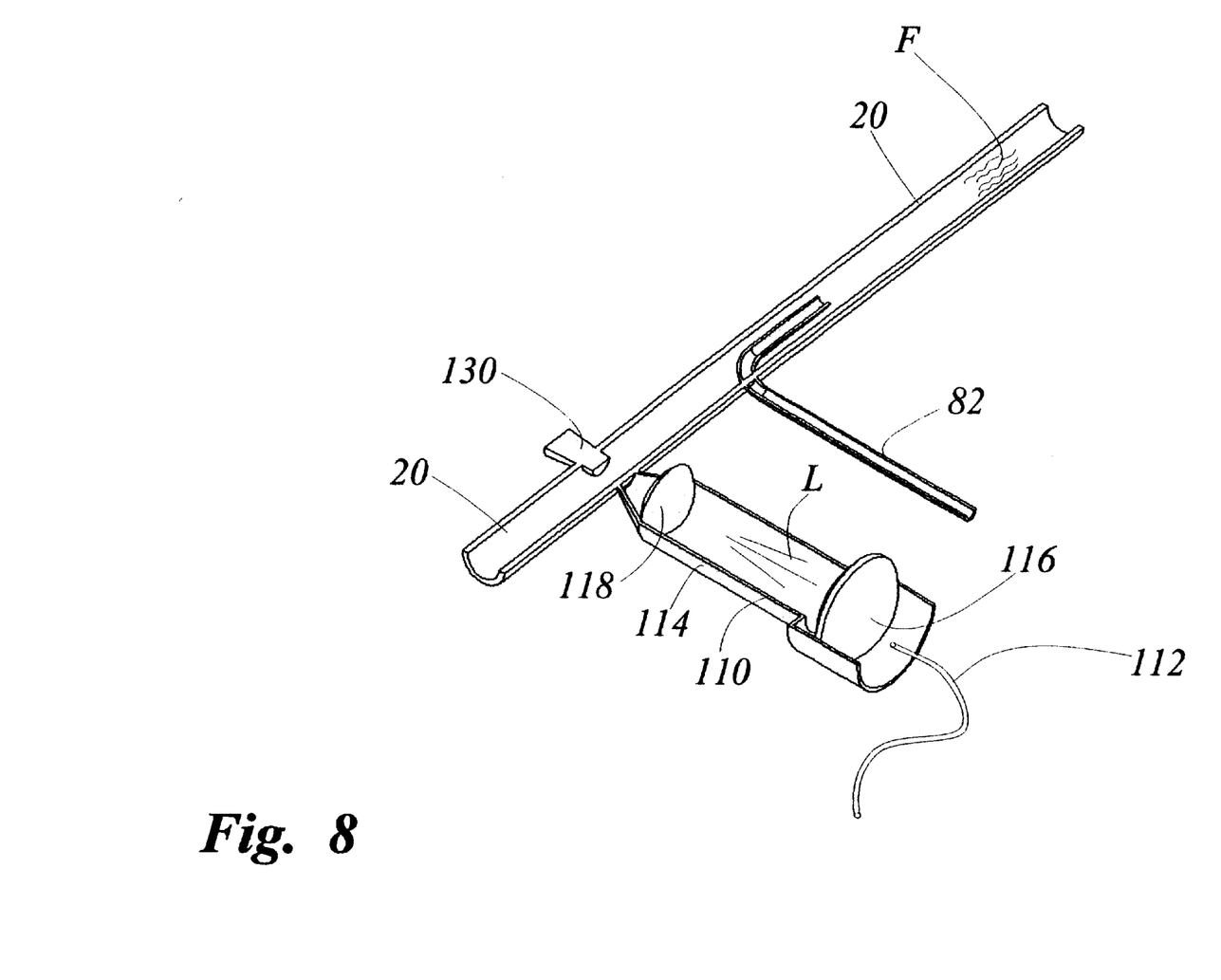
FIG. 8 is a sectional view of part of the voraxial tube and it of the probe light reflector mirrors and lenses, and of a layer removal tube.
Figure 9:
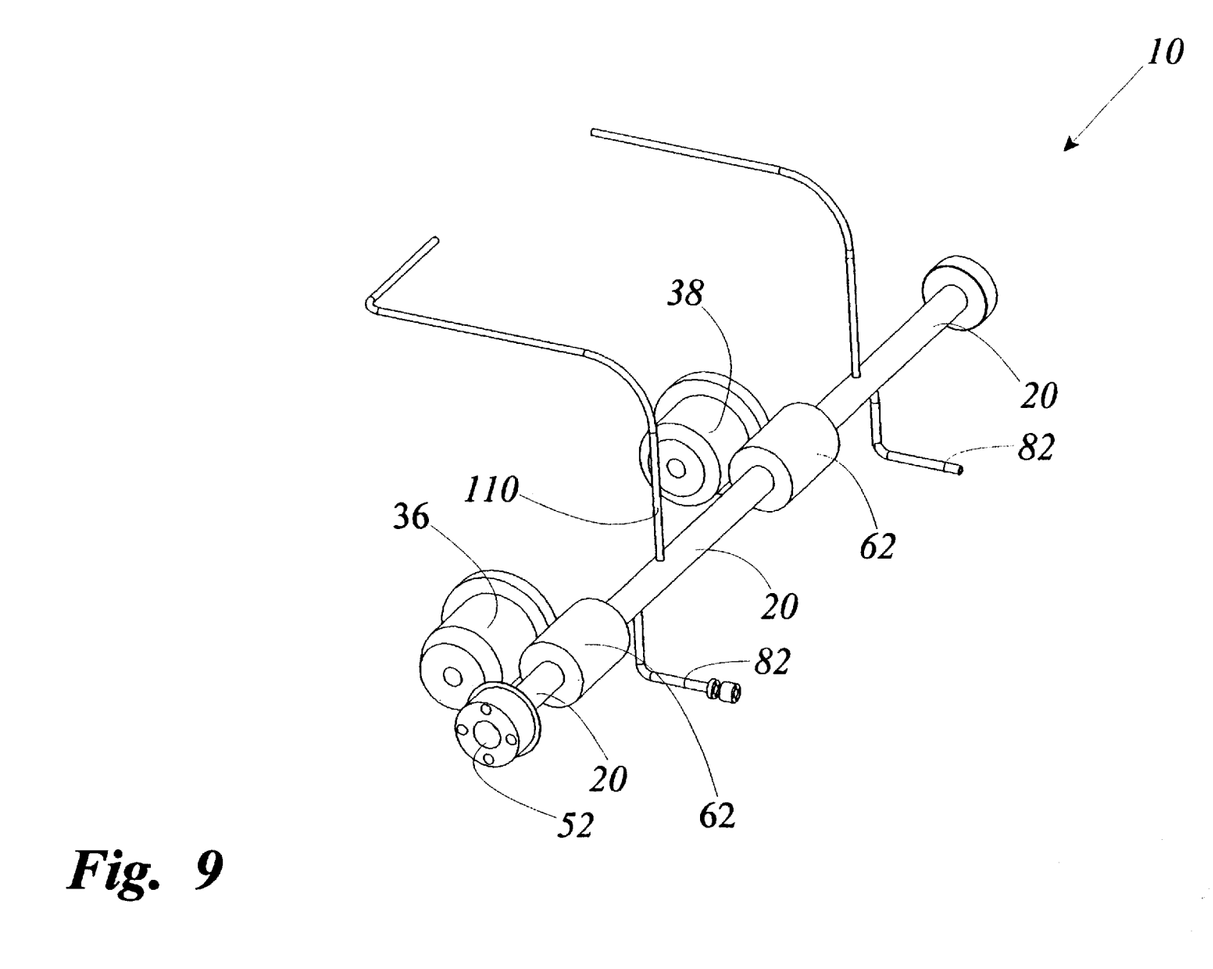
FIG. 9 is a different perspective view of the voraxial separation assembly, showing the rotational acceleration and maintenance vane structures and the two probes and fiber-optic filaments and two layer removal tubes.
Figure 14:
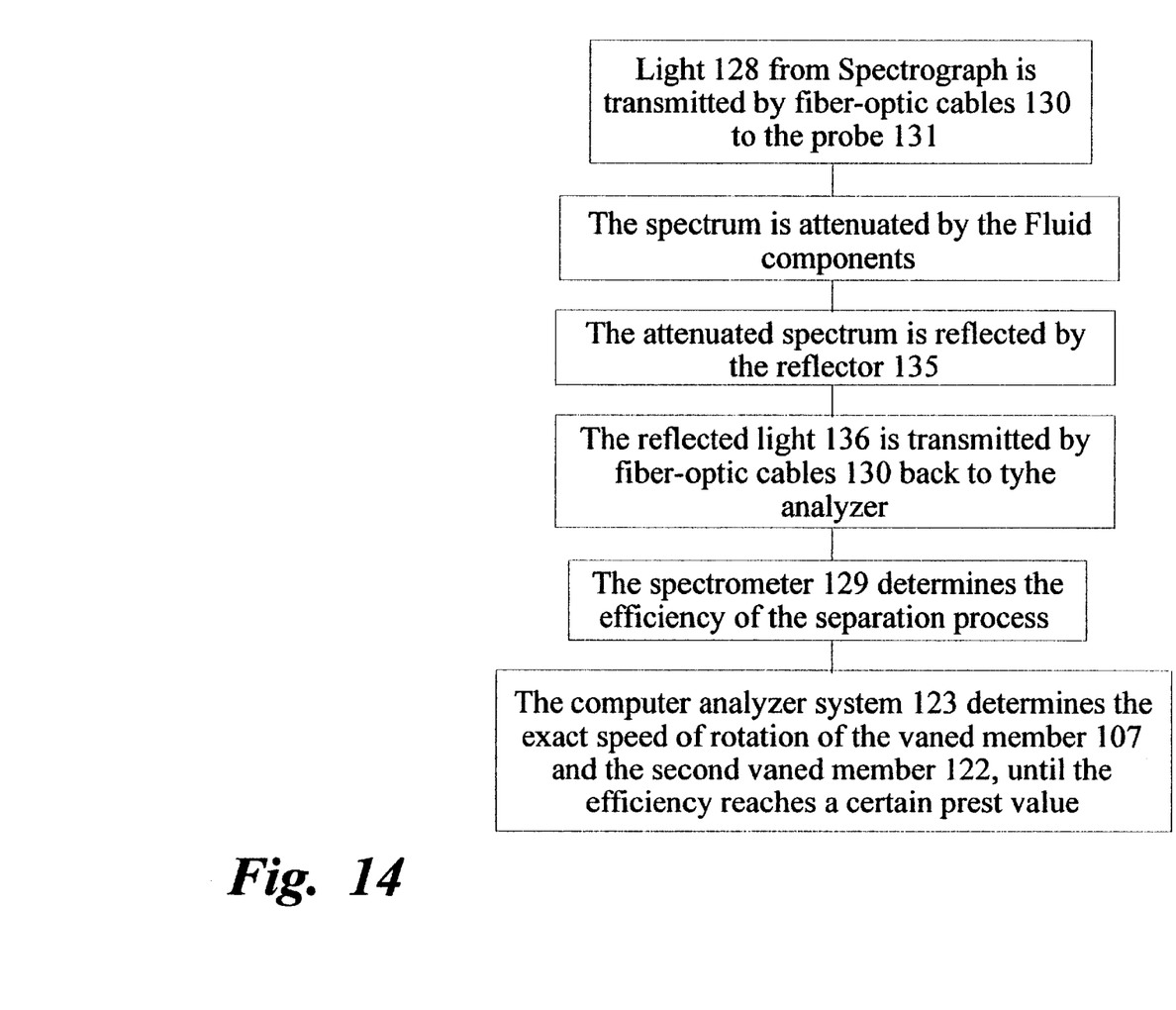
FIG. 14 is a flow chart of how the computer analyzer system obtains data from the probe to control speed of the vane structures.

In order to determine the accuracy of the separation, a fiber-optic probe 110 is attached to the side wall of voraxial tube 20 to determine the concentration of the fluid components that are being separated. Near-infrared (NIR) light L is generated by a spectrophotometer or a spectrometer 112 contained within the apparatus 10. The light L is transmitted through bi-directional fiber-optic cables 112 to fiber-optic probe 110. Fiber-optic probe 110 comprises a tubular housing 114 which holds focusing lenses 116 and 118, as shown in FIG. 8. The light L passes through the fiber-optic probe 110, and is collimated and projected by lenses 116 and 118, through fluid F and onto a mirrored stainless steel reflector 130. Reflector 130 is conveniently positioned diametrically opposite a fiber-optic probe 110 on voraxial tube 20. When the light L passes through the fluid F, a unique spectrum is absorbed by the fluid F at that location. This spectrum is then used by computer analyzer system 100 to determine the concentrations of the fluid components present at that location. The reflected light L is again captured by the bi-directional fiber-optic cable 112 and transported to the spectrograph 112. The spectral characteristics at the scanning point of the fluid F can thus be determined by means of computer analyzer 100. Referring now to FIG. 14, operation of the computer analyzer system 100 is described. Light 128 from the spectrometer 129 is transmitted by fiber-optic cables 130 to the probe 131, the spectrum is attenuated by the fluid components, the attenuated spectrum is reflected by the reflector 135, and the reflected light 136 is transmitted by fiber-optic cables 130 back to the computer analyzer system 100. Then the spectrometer 129 determines the efficiency of the separation process and the computer analyzer system 100 determines the exact speed of rotation of the vaned member 107 and the second vaned member 122, until the efficiency reaches a certain preset value. The preferred computer analyzer 100 is described in U.S. Pat. No. 5,489,900 to Anthony. Fiber optic probe 110 is also described in U.S. Pat. No. 5,044,755 to Anthony, et al. The disclosures of both of these prior patents are incorporated by reference into the present application. Thus the efficiency of the separation process can be accurately determined by singular integrated apparatus 10, described in this invention.

Figure 13:
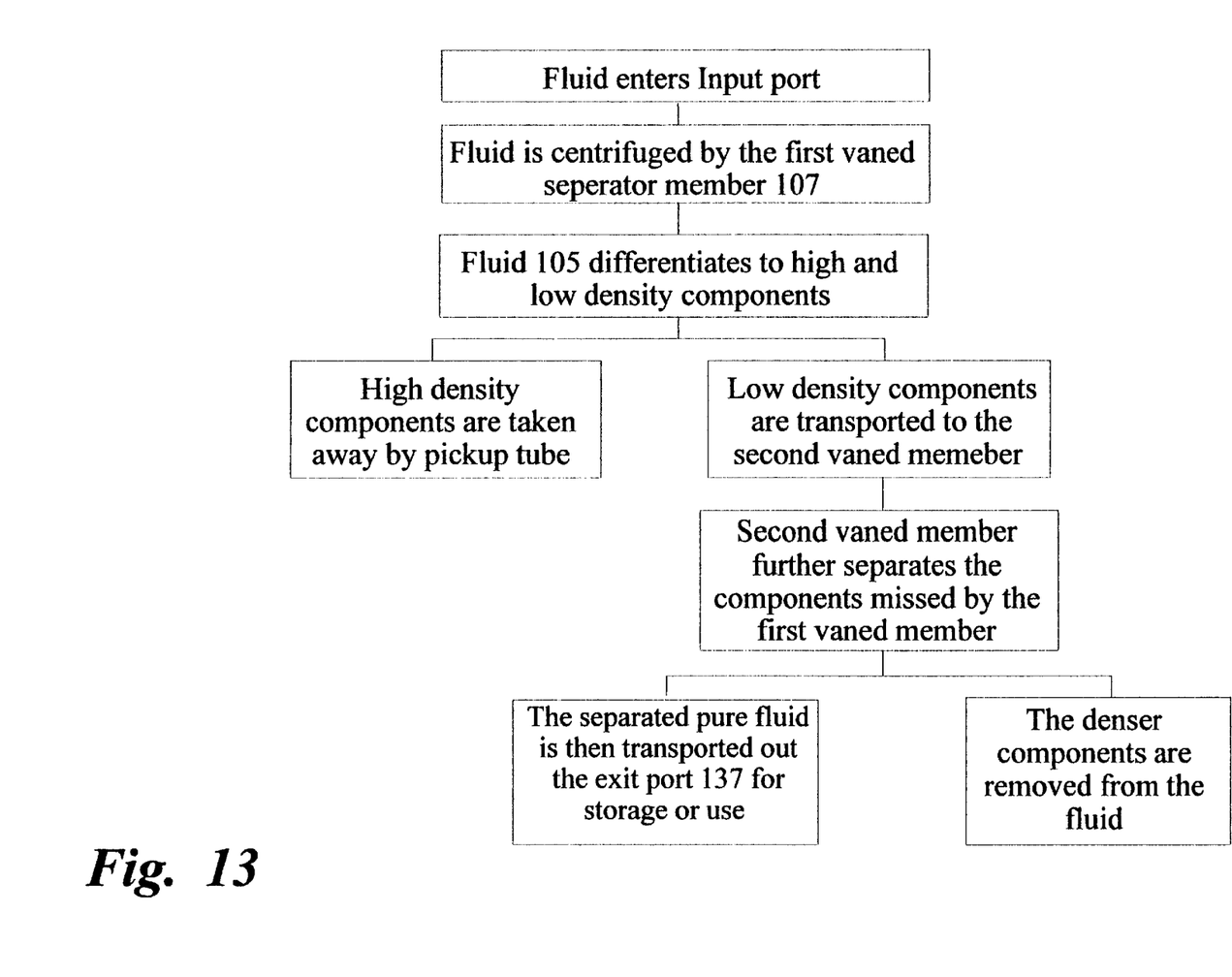
FIG. 13 is an operational flow chart of separation of components from a fluid being treated in the centrifugal separator.

Referring now to FIG. 13, operation of the centrifugal separator to separate a fluid into high and low density component is described. Fluid 105 enters the input port. The fluid is centrifuged by the first vaned separator member 107, and then the fluid 105 differentiates into high and low density components. The high density components are taken away by collector tube 82. Low density components are transported to the second vaned separator member 122, the second member then further separates the components missed by the first vaned member. The pure fluid is transported out of exit port 137 for storage or use and the denser components are removed from the fluid.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A voraxial separator and analyzer apparatus, comprising:

a composite fluid passing tube having a tube upstream segment and a tube downstream segment;

rotation acceleration vane means rotationally mounted within said tube upstream segment and being oriented to deliver angular acceleration to a composite fluid within said tube about the longitudinal axis of said tube for creating a forced vortex in said tube upstream segment and thereby also creating a free vortex within said tube downstream segment for separating the fluid into radially stratified component layers within said tube downstream segment in the order of component density and to propel the fluid toward and through said tube downstream segment;

acceleration vane drive means drivably connected to said rotation acceleration vane means;

first rotation maintenance vane means rotationally mounted within said tube downstream segment and being oriented to deliver angular acceleration to a composite fluid within said tube about the longitudinal axis of said tube for maintaining the rotational velocity of the fluid imparted by said rotation acceleration vane means against friction losses and to thereby sustain said free vortex against degeneration and thus to sustain the stratification of the component layers;

and maintenance vane drive means separate from said acceleration vane drive means and drivably connected to said first rotation maintenance vane means;

fluid probe means extending into said tube downstream of said rotation acceleration means and positioned to detect fluid composition at a plurality of radial locations within said tube and to generate probe signals, and fluid analyzer computer means receiving and analyzing said probe signals for feedback to control the angular speed of said rotation acceleration vane means and the angular speed of said rotation maintenance vane means;

first speed control means controlling the rotational rate of said acceleration vane drive means; second speed control means controlling the rotational rate of said maintenance vane drive means independent of the speed of said first speed control means; feedback loop means interconnecting said fluid analyzer computer means and said first speed control means and said second speed control means;

such that said fluid analyzer computer means causes said first speed control means to alter the rate of rotation of said rotation acceleration vane means to achieve radial layer component separation within said free vortex and to alter the rate of rotation maintenance vane means rotation to maintain the rotation speed of said fluid within the free vortex with automatic control and feedback.

2. The apparatus of claim 1, additionally comprising a second rotation maintenance vane means within said tube downstream segment downstream of said first rotation maintenance vane means.

3. The apparatus of claim 1, wherein said rotation acceleration vane means comprises a belt driven impeller.

4. The apparatus of claim 1, wherein said rotation maintenance vane means comprises a belt driven impeller.

5. The apparatus of claim 1, wherein said fluid probe means comprises a fiber-optic probe and a spectrophotometer connected to said fiber-optic probe with a bi-directional fiber-optic cable and a reflector element within said tube opposite said fiber-optic probe;

such that said spectrophotometer generates light, and the light passes through said bi-directional fiber-optic cable to and through said fluid to said reflector element, whereupon a unique spectrum of the light is absorbed by the fluid, and whereupon the remaining light is reflected by said reflector element to said fiber-optic probe for analysis by said fluid analyzer computer means.

* * * * *